United States Patent [19]

Kim et al.

[11] Patent Number: 5,661,745
[45] Date of Patent: Aug. 26, 1997

[54] METHOD AND APPARATUS FOR GENERATING HIGH PEAK POWER LASER PULSES IN LAMP PUMPED CONTINUOUS WAVE LASERS BY CURRENT MIXING

[75] Inventors: Cheol-Jung Kim; Jung-Moog Kim; Kwang-Suk Kim, all of Daejeon-si, Rep. of Korea

[73] Assignee: Korea Atomic Energy Research Institute, Daejjeon-si, Rep. of Korea

[21] Appl. No.: 455,415

[22] Filed: May 31, 1995

[30] Foreign Application Priority Data

Jan. 9, 1995 [KR] Rep. of Korea .......................... 95-280

[51] Int. Cl.$^6$ ................................................ H01S 3/091
[52] U.S. Cl. ................................................ 372/70; 372/38
[58] Field of Search ................................ 372/38, 69, 33, 372/29, 82, 70

[56] References Cited

U.S. PATENT DOCUMENTS

| | | | |
|---|---|---|---|
| 4,591,761 | 5/1986 | Gregorich et al. | 372/29 |
| 4,856,012 | 8/1989 | Takenaka | 372/38 |
| 5,065,401 | 11/1991 | Scifres et al. | 372/38 |
| 5,068,545 | 11/1991 | Molnar | 372/38 |
| 5,123,023 | 6/1992 | Santarelli et al. | 372/38 |
| 5,355,277 | 10/1994 | Carvalho | 372/38 |
| 5,359,279 | 10/1994 | Gidon et al. | 372/82 |
| 5,384,800 | 1/1995 | Hochgraeber et al. | 372/38 |
| 5,434,880 | 7/1995 | Burrows et al. | 372/38 |

*Primary Examiner*—Leon Scott, Jr.
*Attorney, Agent, or Firm*—Nikaido Marmelstein Murray & Oram LLP

[57] ABSTRACT

A method for generating high peak power pulses in lamp pumped continuous lasers by current mixing is disclosed, in which three kinds of oscillations, i.e., pure continuous wave laser oscillation, pure pulse laser oscillation and mixed laser oscillation of continuous wave and pulse lasers are attained without replacing any internal components of the laser. The current mixing is implemented by combining a high peak pulse current from pulse mode power supply and a DC current from the continuous wave laser power supply directly with isolating diodes, whereby a high peak power pulse equivalent to several scores of times the output of a continuous wave laser is simultaneously obtained.

6 Claims, 4 Drawing Sheets

SW: GTO THYRISTOR, MCT, SCR PAIR

SW: MOSFET, IGBT, BJT,.

METHOD AND APPARATUS FOR GENERATING HIGH PEAK POWER LASER PULSES IN LAMP PUMPED CONTINUOUS WAVE LASERS BY CURRENT MIXING

FIELD OF INVENTION

The present invention relates to a method for generating high peak power laser pulses in lamp pumped continuous wave lasers by current mixing. Furthermore, this current mixing method can generate three kinds of laser oscillations, i.e., pure continuous wave laser oscillation, pure pulsed laser oscillation, and mixed laser of continuous wave and pulsed oscillations, without replacing internal components of laser.

BACKGROUND OF THE INVENTION

FIG. 1 illustrates the electrical block diagram of the conventional lamp pumped laser. The lamp pumped laser is composed of high-voltage pulse forming unit for triggering of lamp and a power supply for supplying electrical power to the lamp after the triggering.

As to the method of supplying electrical power, a DC current from a DC power supply is supplied in the case of a continuous wave laser, on the other hand, in the case of a pulse laser, a pulsed current having the same pattern as the pulsed laser output is supplied from a pulse mode power supply which is designed to supply high peak current for short period.

Up to the present, the continuous wave laser and the pulse laser have been applied in the different fields utilizing the merits of each one. Then, in an attempt to combine the merits of continuous wave and pulse lasers, the output of continuous wave laser has been modulated by modulating the input current to the lamp. However, the maximum peak power of the modulated continuous wave laser is limited by the power handling capacity of modulated power supply and it is at best 2 to 3 times the maximum average output power of continuous wave laser itself.

SUMMARY OF THE INVENTION

The present invention is intended to overcome the above described disadvantages of the conventional techniques. So, it is intended to generate a laser which consists of both continuous and pulse components. Furthermore, it is intended to increase the absolute peak power of pulse laser and also the ratio of the peak power of pulse laser to the average power of continuous wave laser.

In achieving the above objects, two power supplies of a DC power supply and a pulse mode power supply are switched by isolating diodes and the current from each power supply can be mixed together at lamp. Therefore, the peak pulse current is limited by the power handling capacity of pulse mode power supply and not by the power handling capacity of DC power supply. So, the absolute peak power of pulse laser and the ratio of the peak power of pulse laser to the average power of continuous wave laser can be a few kW's and more than 10 respectively even with a small pulse mode power supply.

Furthermore, three kinds of laser oscillations, i.e., pure continuous wave laser oscillation, pure pulsed laser oscillation and mixed laser of continuous wave oscillation and pulsed oscillation, are accomplished by the ON/OFF controls of both power supplies.

The mixed laser with high peak power pulse can improve the performance of laser cutting. Furthermore, the diverse modes of laser oscillation and the capability of producing a high peak pulse laser over continuous wave laser can also be applied to various kinds of lasers such as Er:YAG laser, Ho:YAG, 2nd harmonic Nd:YAG and dye laser.

BRIEF DESCRIPTION OF THE DRAWINGS

The above objects and other advantages of the present invention will become more apparent by describing in detail the preferred embodiment of the present invention with reference to the attached drawings in which:

FIG. 4 illustrates the various types of pulse mode power supplies which can be used in current mixing of the present invention, in which;

DESCRIPTION OF THE PREFERRED EMBODIMENT

The present invention will be described in detail referring to FIGS. 2 to 5.

Figure 1:
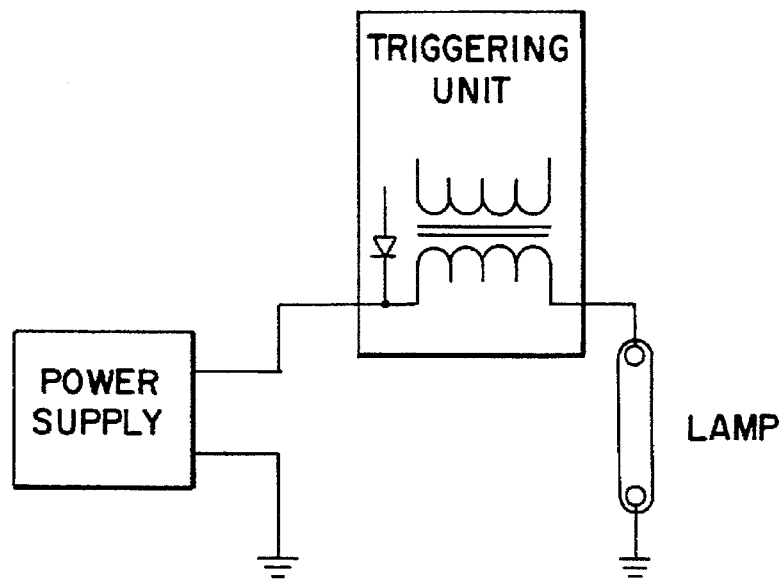
FIG. 1 is a schematic illustration of the electrical block diagram of the conventional lamp pumped laser.
Figure 2:
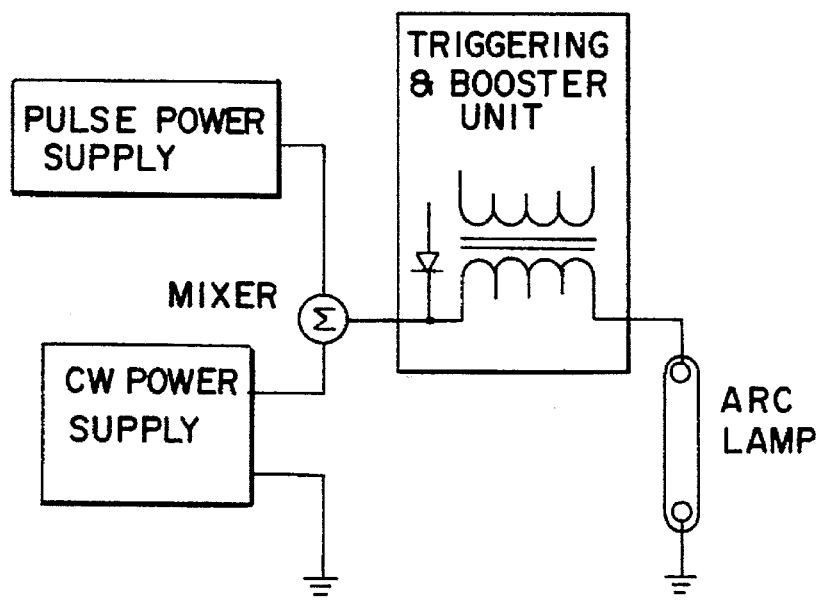
FIG. 2 is a schematic illustration of the electrical block diagram of the current mixed lamp pumped laser.

(1) Conception of the current mixing, as shown in FIG. 2.

The idea of current mixing is to add the high peak pulsed current from a pulse mode power supply to the DC current from a DC power supply by a mixer. Therefore, the maximum peak current for generation of pulse laser is limited only by the peak current capacity of the pulse mode power supply. The pulse mode power supply can be designed to deliver much higher power for short period than the average input power it uses. So, the peak power of pulse laser from the present invention can be much higher than the peak power of modulated laser where a power supply similar to a DC power supply is modulated and the peak power is limited by the maximum power handling capacity of it which is usually 2 to 3 times higher than the maximum average power it uses.

(2) Principle of the current mixing

Figure 3:
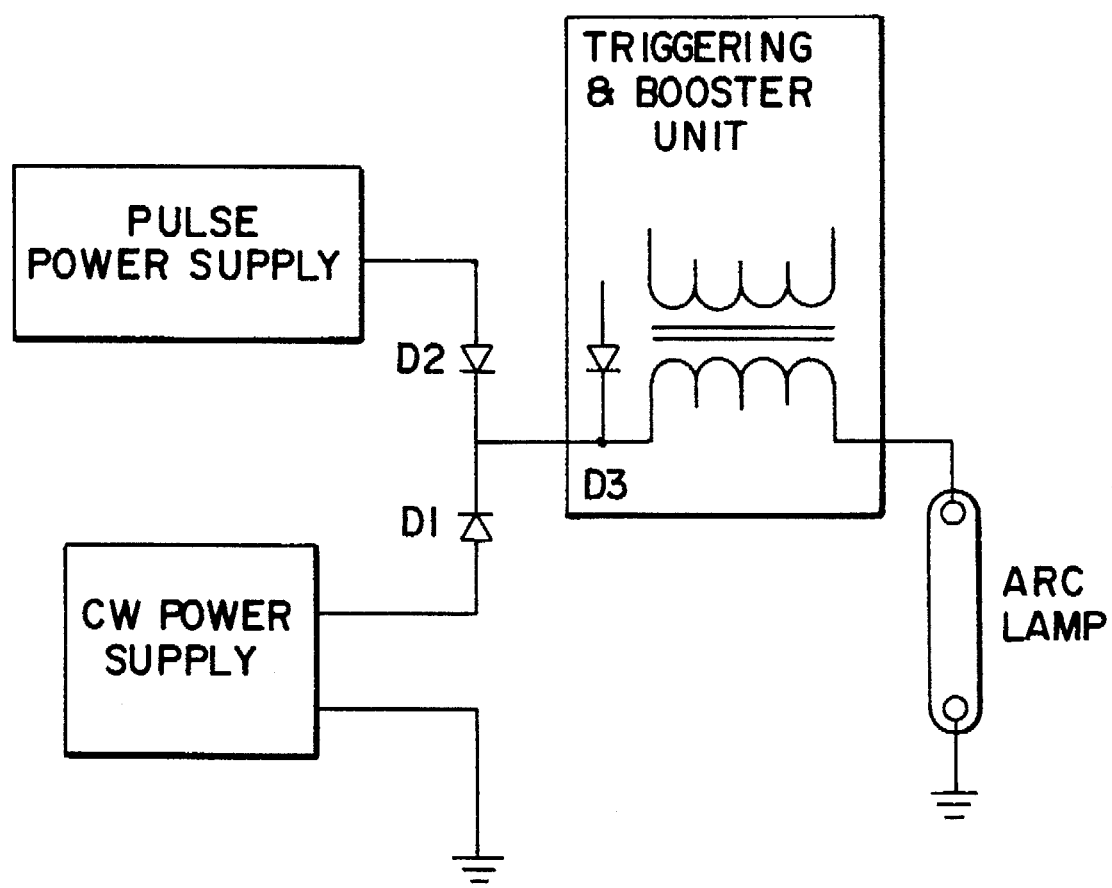
FIG. 3 is a schematic illustration for mixing currents from the continuous wave power supply and the pulse mode power supply by switching of isolating diodes.

FIG. 3 is a schematic view showing the principles of current mixing based on the diode switching method. It can be implemented due to the recent development of fast and high-current diodes.

First, the lamp is triggered by the triggering unit and booster current flows through diode D3 and maintains the lamp on. The diodes D1 and D2 block the booster current and protect both power supplies during laser operation. Furthermore, the high voltage of triggering pulse is only applied to the both ends of the lamp. Therefore, both the pulse mode and the continuous wave power supplies are not damaged from the high voltage of triggering pulse.

Then, the pulse laser from the pulse power supply or the continuous wave laser from the continuous wave power supply can be operated by the separated but simultaneous control of both power supplies. This is the highlight of the present invention.

(3) Laser oscillation by current mixing

If the high voltage from the pulse mode power supply is applied the lamp to generate pulse laser, then the diode D1 is being blocked and the continuous wave power supply is being protected from the high voltage of pulse mode power supply during the pulse laser oscillation. Therefore, during pulse operation period, the continuous wave laser oscillation is being shut off even if it has been kept on before. Actually, the continuous wave power supply is being used as a simmer source to maintain the lamp on during pulse laser oscillation. Therefore, the continuous wave power supply has to be kept on always at about a few hundreds of mA's to supply the simmer current.

On the other hand, during pure continuous wave laser oscillation, the diode D2 is being blocked and all the current from the continuous wave power supply is flowing to the lamp.

In conculsion, the current mixing is embodied by the switching of isolating diodes and the three kind of laser oscillations can be realized. Furthermore, the peak power can be increased much even with a small size pulse mode power supply. The average power of the pulse laser is limited by the average power capacity of the pulse mode power supply, but the peak power is limited by the peak power capacity of the pulse mode power supply and it can be much higher than its average power limit.

(4) Design of pulse mode power supplies for different pulse shapes

Figure 4A:
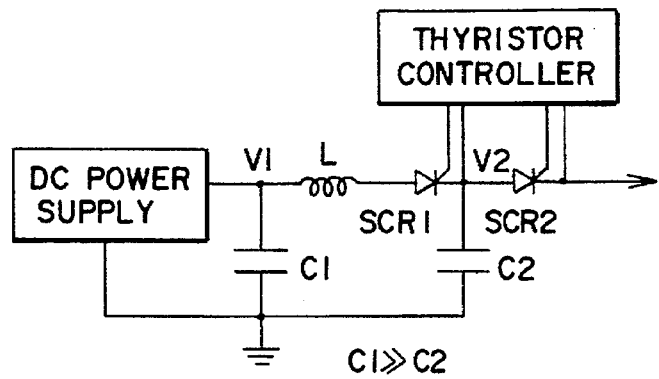
FIG. 4A illustrates a fixed pulse width type.
Figure 4B:
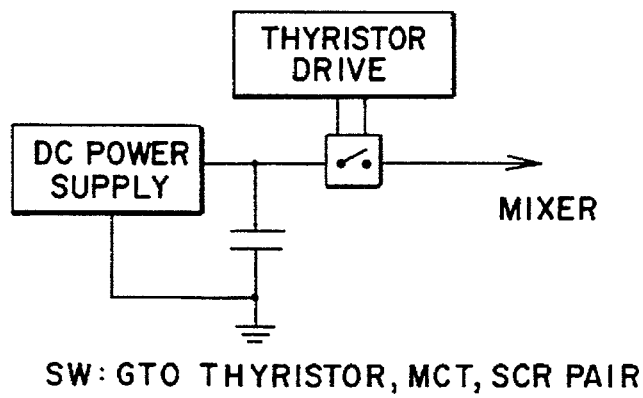
FIG. 4B illustrates a variable pulse width type.
Figure 4C:
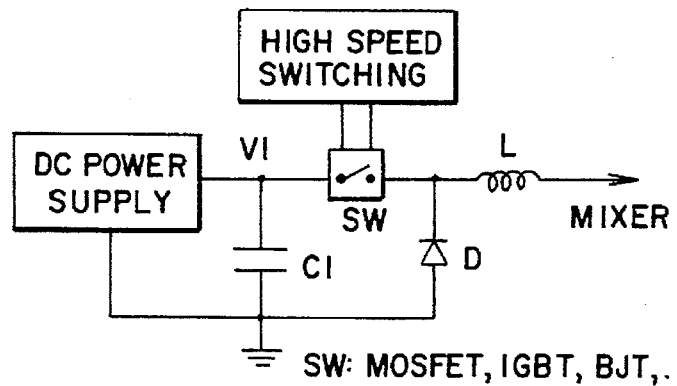
FIG. 4C illustrates a pulse mode power supply which can vary both of the pulse width and the pulse height.

FIGS. 4A, 4B and 4C shows different types of pulse mode power supplies which can be used with the present invention.

FIG. 4A illustrates the pulsed mode power supply for fixed pulse width oscillation. It has the advantage of easy high voltage generation i.e., high peak pulse laser oscillation, based on the voltage doubling from resonance charging. Also, an energy of $C_2V_2^2/2$ J per pulse is supplied for each pulse. It is compact, but requires a stable DC power supply for stable pulse laser oscillation.

In the circuit of FIG. 4B, the pulse width can be varied by the ON/OFF control of thyristors. Furthermore, due to the large capacitance of the capacitor $C_1$, a relatively less stabilized DC power supply can be tolerated and much broader range of peak power variation can be attained than with FIG. 4A. But, the constitution of the circuits is more complicated, and it is more difficult to produce high peak power than with FIG. 4A.

In the circuit of FIG. 4C, the variation of both pulse width and pulse height can be implemented by adjusting the switching period and the switching duty respectively. Both of them can be varied even within a single pulse. Therefore, the voltage of DC power can be fixed to obtain wider ranges of pulse shapes. However, the constitution of the circuit is most complicated and it is difficult to obtain high average and high peak pulse laser oscillation.

(5) Output shape of mixed laser oscillation and its application

Figure 5:
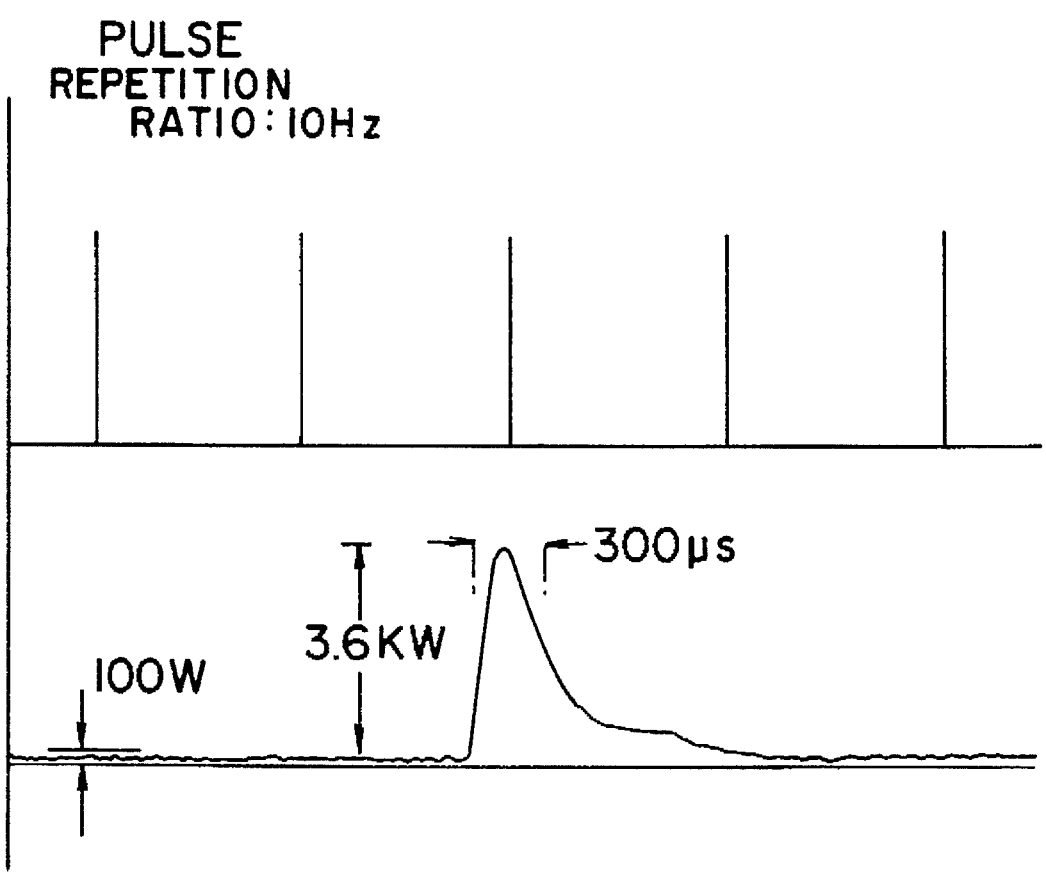
FIG. 5 shows the output of Nd:YAG laser, in which the laser pulse train are added on the continuous wave laser by the current mixing of the present invention. The upper portion shows the pulse train and the lower one shows the expanded single pulse.

FIG. 5 illustrates the oscilloscope printout of the laser pulse pattern from mixed laser oscillation by the present invention. The upper one shows the output from a detector and shows the pulse train and the lower one shows the expanded view of the single pulse. The level of continuous wave laser is about 100 W and the peak power is 3.6 kW. So, the ratio of 36 was realized by the current mixing method.

The present invention as described above can be commonly applied to all types of lamp pumped lasers. Particularly, the laser cutting performance from the mixed laser oscillation of Nd:YAG laser can be improved much with current mixing. Furthermore, the present invention can be applied to an Er:YAG laser, a Ho:YAG laser, a 2nd harmonic Nd:YAG laser, a dye laser and other lamp pumped lasers, so that the merits of respective lasers can be improved and the applications of the lasers can be expanded.

What is claimed is:

1. A method circuit for generating high peak power in a laser comprising providing a pulse mode power supply, a continuous power supply, a laser, triggering means, boosting means and isolating diodes;

triggering the laser to turn on by said triggering means;

boosting current to the laser by said boosting means to maintain booster output voltage while blocking output from the pulse mode power supply and the continuous power supply when outputs therefrom are less than the booster output voltage; and simultaneous controlling and separately operating one of the continuous power supply and the pulse mode power supply by switching of said isolating diodes, wherein said continuous power supply is protected from high voltage during pulse laser oscillation from said pulse mode power supply by switching off one of said isolating diodes.

2. A method according to claim 1, wherein said power sources are controlled to output at least on of (a) continuous power only, (b) pulse power only and (c) a combination of continuous power and pulse power wherein said laser outputs three kinds of laser oscillation.

3. A method according to claim 1, wherein a first isolating diode is switched on when the output of the continuous power supply is higher than the booster output voltage and is switched off when the output of the pulse mode power supply is higher than the output of the continuous power supply.

4. A method according to claim 1, wherein first and second isolating diodes are provided, said first isolating diode is switched on when output of the continuous power supply is higher than the booster output voltage and said first isolating diode is switched off when said second isolating diode is switched on.

5. A circuit for generating high peak power in a laser comprising:

a laser;

a pulse mode power supply;

a continuous power supply;

a triggering means for triggering the laser to turn on;

boosting circuit, connected to said laser, boosting current to the laser to maintain booster output voltage while blocking output from the pulse mode power supply and the continuous power supply when outputs therefrom are less than the booster output voltage; and isolating diodes connected to said boosting circuit, said isolating diodes simultaneously controlling and separately operating one of the continuous power supply and the pulse mode power supply by switching of said isolating diodes, wherein said continuous power supply is protected from high voltage during pulse laser oscillation from said pulse mode power supply by switching off one of said isolating diodes.

6. A circuit according to claim 5, wherein a first isolating diode is switched on when the output of the continuous power supply is higher than the booster output voltage and is switched off when the output of the pulse mode power supply is higher than the output of the continuous power supply.

* * * * *